(12) United States Patent
Kawabe et al.

(10) Patent No.: US 10,464,406 B2
(45) Date of Patent: Nov. 5, 2019

(54) VEHICLE BODY BOTTOM STRUCTURE

(71) Applicant: HONDA MOTOR CO., LTD., Tokyo (JP)

(72) Inventors: Satoru Kawabe, Wako (JP); Shutaro Sao, Wako (JP); Ken Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/870,127

(22) Filed: Jan. 12, 2018

(65) Prior Publication Data

US 2018/0236863 A1 Aug. 23, 2018

(30) Foreign Application Priority Data

Feb. 17, 2017 (JP) .................................. 2017-027669

(51) Int. Cl.
| | |
|---|---|
| *B60K 1/04* | (2019.01) |
| *B62D 25/20* | (2006.01) |
| *B62D 21/15* | (2006.01) |
| *B62D 25/02* | (2006.01) |

(52) U.S. Cl.
CPC .............. *B60K 1/04* (2013.01); *B62D 21/157* (2013.01); *B62D 25/025* (2013.01); *B62D 25/20* (2013.01); *B62D 25/2018* (2013.01); *B62D 25/2036* (2013.01); *B60K 2001/0438* (2013.01); *B60K 2001/0472* (2013.01); *B60Y 2306/01* (2013.01)

(58) Field of Classification Search
CPC ..... B60K 1/04; B60L 11/1812; B60L 11/1814
See application file for complete search history.

(56) References Cited

U.S. PATENT DOCUMENTS

2013/0192914 A1* 8/2013 Nakamori ................ B60K 1/04
180/68.5

FOREIGN PATENT DOCUMENTS

| JP | 2014-080117 A | 5/2014 |
|---|---|---|
| JP | 2017-196952 A | 11/2017 |

OTHER PUBLICATIONS

Japanese Office Action with English Translation dated Aug. 28, 2018, 6 pages.

* cited by examiner

*Primary Examiner* — Bryan A Evans
(74) *Attorney, Agent, or Firm* — Rankin, Hill & Clark LLP

(57) ABSTRACT

An object of the present invention is to provide a vehicle body bottom structure capable of more reliably protecting a battery pack at a time of a side collision of a vehicle. A vehicle body bottom structure of the present invention includes a battery pack disposed below a floor panel, a side sill extending in a vehicle front-rear direction outside in a vehicle width direction and a battery side frame allowing the side sill to support the battery pack, wherein the battery side frame has a lower surface positioned outside in the vehicle width direction and positioned lower than a support portion for the battery pack, the support portion being formed inside in the vehicle width direction of the battery side frame.

5 Claims, 15 Drawing Sheets

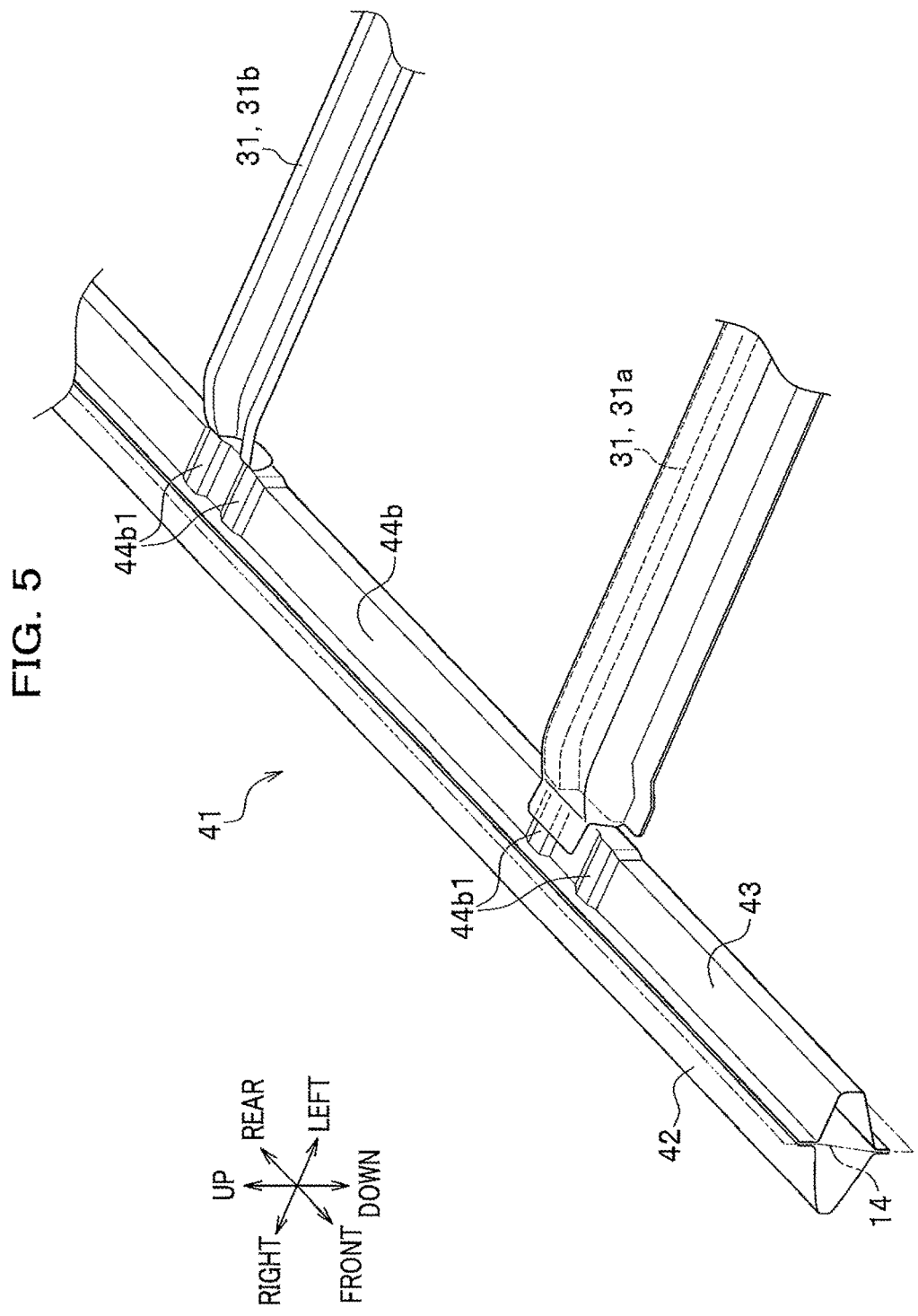

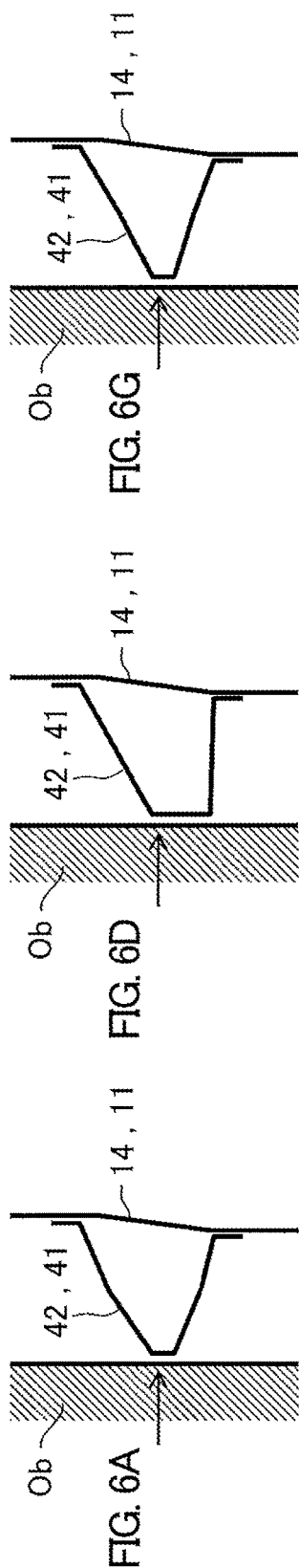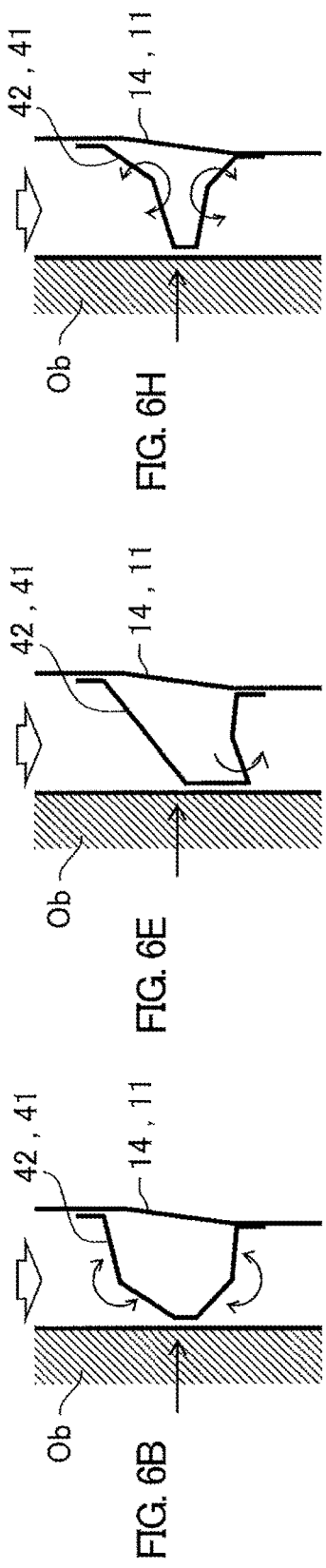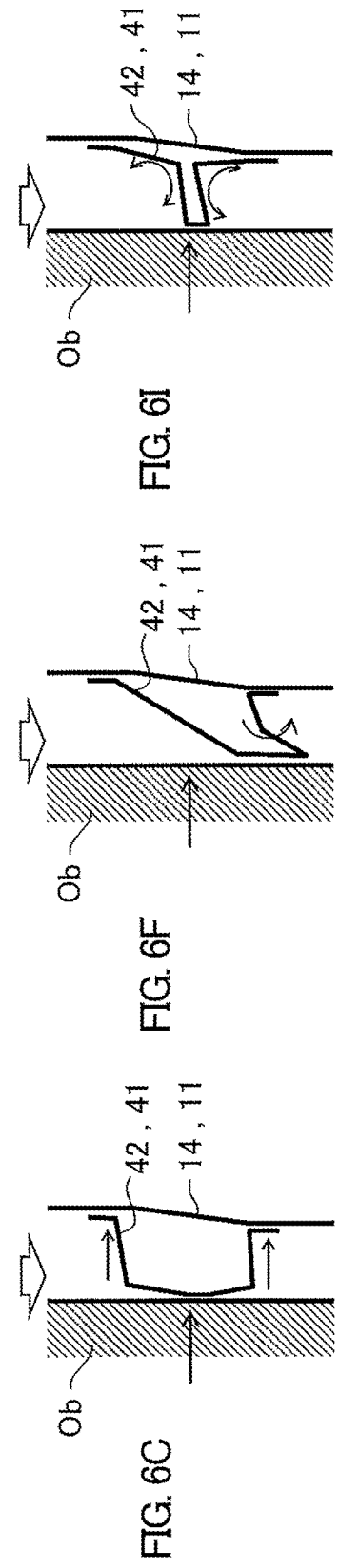

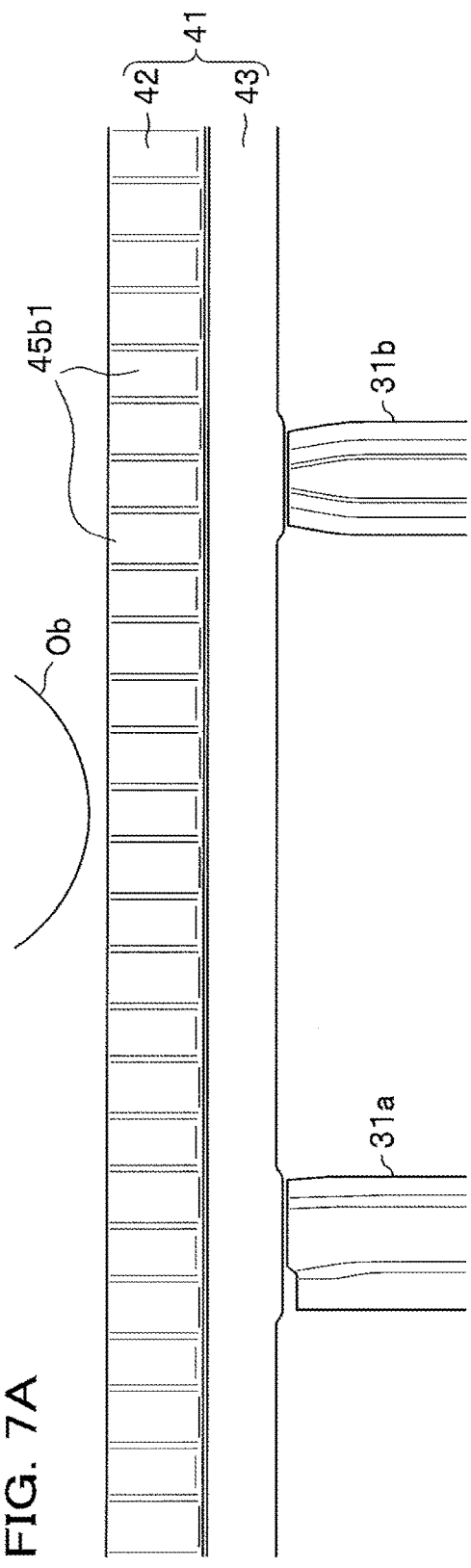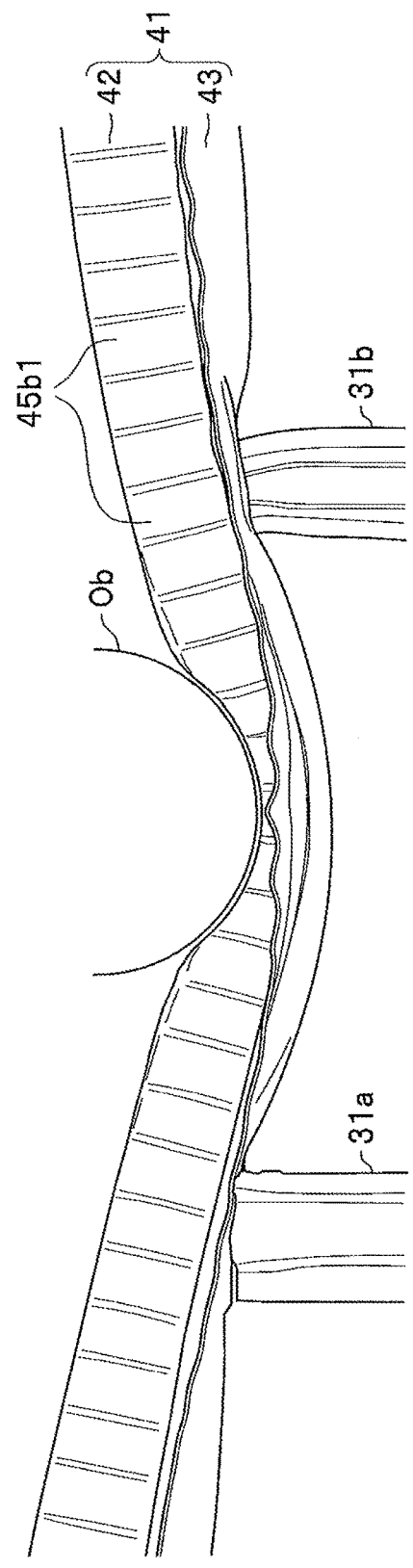

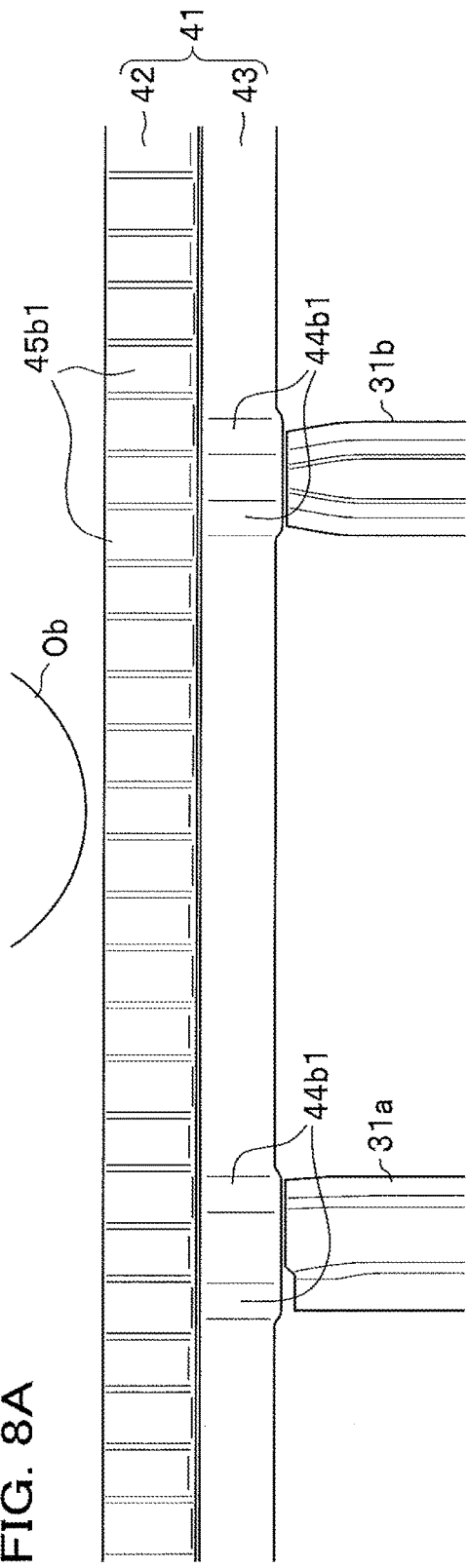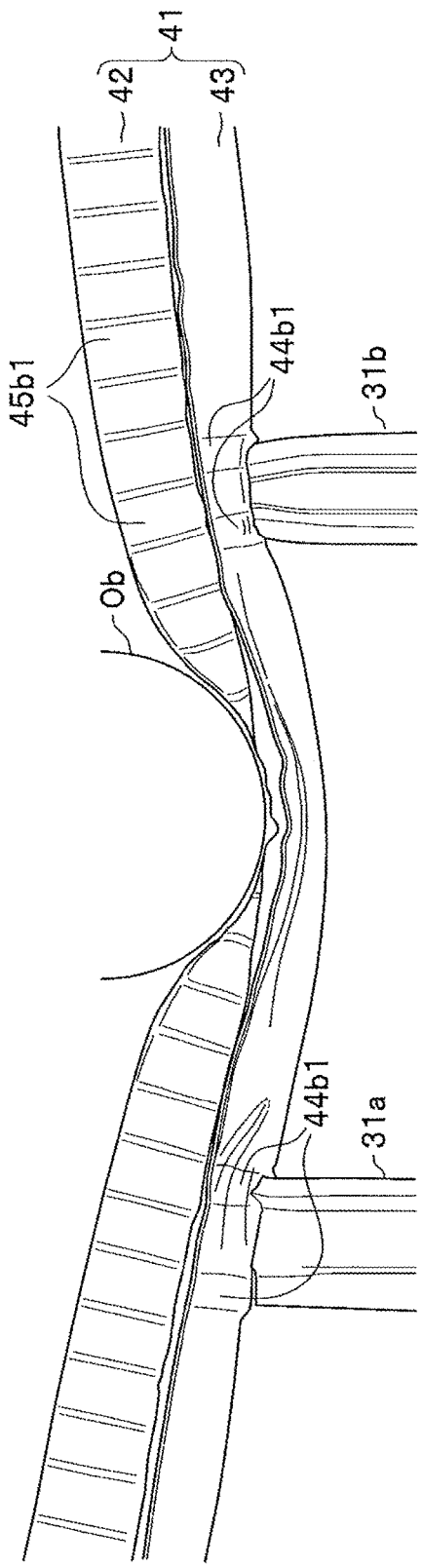

VEHICLE BODY BOTTOM STRUCTURE

CROSS REFERENCE TO RELATED APPLICATIONS

This application claims the foreign priority benefit under Title 35, United States Code, § 119 (a)-(d) of Japanese Patent Application No. 2017-027669, filed on Feb. 17, 2017, the disclosure of which is herein incorporated by reference in its entirety.

TECHNICAL FIELD

The present invention relates to a vehicle body bottom structure.

BACKGROUND ART

Conventionally, a vehicle body bottom structure in which a battery pack is disposed below a floor panel has been known (for example, see Patent Document 1). This vehicle body bottom structure includes a ductile member extending from a side sill side to the battery pack side in order to prevent damage to a side surface of the battery pack upon a side collision of the vehicle.

CITATION LIST

Patent Literature

Patent Document 1: Japanese Patent Application Publication No. 2014-080117

SUMMARY OF INVENTION

Technical Problem

However, in the vehicle body bottom structure, the side surface of the battery pack is displaced so as to be bent upward by a load input upon the side collision of the vehicle. In the vehicle body bottom structure, such a displacement may damage a structure such as a battery module in the battery pack. Therefore, there is a demand for a vehicle body bottom structure capable of more reliably protecting the battery pack upon the side collision of the vehicle.

An object of the present invention is to provide a vehicle body bottom structure capable of more reliably protecting the battery pack upon the side collision of the vehicle.

Solution to Problem

In order to solve the above problems, the present invention is a vehicle body bottom structure including a battery pack disposed below a floor panel, a side sill extending in a vehicle front-rear direction outside in a vehicle width direction, and a battery side frame extending in the vehicle front-rear direction between the battery pack and the side sill and allowing the side sill to support the battery pack, wherein the battery side frame has a lower surface positioned outside in the vehicle width direction and positioned lower than a support portion for the battery pack, the support portion being formed inside in the vehicle width direction of the battery side frame.

Advantageous Effects of Invention

According to the present invention, it is possible to provide a vehicle body bottom structure capable of more reliably protecting the battery pack upon the side collision of the vehicle.

BRIEF DESCRIPTION OF DRAWINGS

FIG. 5 is a partial perspective view showing a stiffener disposed in a left side sill of a vehicle body, viewed from an obliquely front upper side of the vehicle body, in a positional relationship with the floor cross members;

FIGS. 6A to 6C are conceptual diagrams showing how an outer stiffener of the present embodiment is deformed upon a side collision;

FIGS. 6D to 6F are reference diagrams contrasting with FIGS. 6A to 6C;

FIGS. 6G to 6I are reference diagrams contrasting with FIGS. 6A to 6C;

FIGS. 7A and 7B are conceptual diagrams showing deformation of the stiffener when a load at a time of the side collision is input from an object to the stiffener in which the outer stiffener has beads and an inner stiffener has no bead;

FIGS. 8A and 8B are conceptual diagrams showing deformation of the stiffener when the load at the time of the side collision is input from the object to the stiffener in which the outer stiffener has beads and the inner stiffener partially has beads;

DESCRIPTION OF EMBODIMENTS

Next, a vehicle body bottom structure according to an embodiment of the present invention (the present embodiment) will be described in detail. A vehicle body in the present embodiment is assumed to be applied to vehicles such as an electric vehicle, a hybrid vehicle and a fuel cell vehicle, which are equipped with a high capacity secondary battery.

Figure 1:
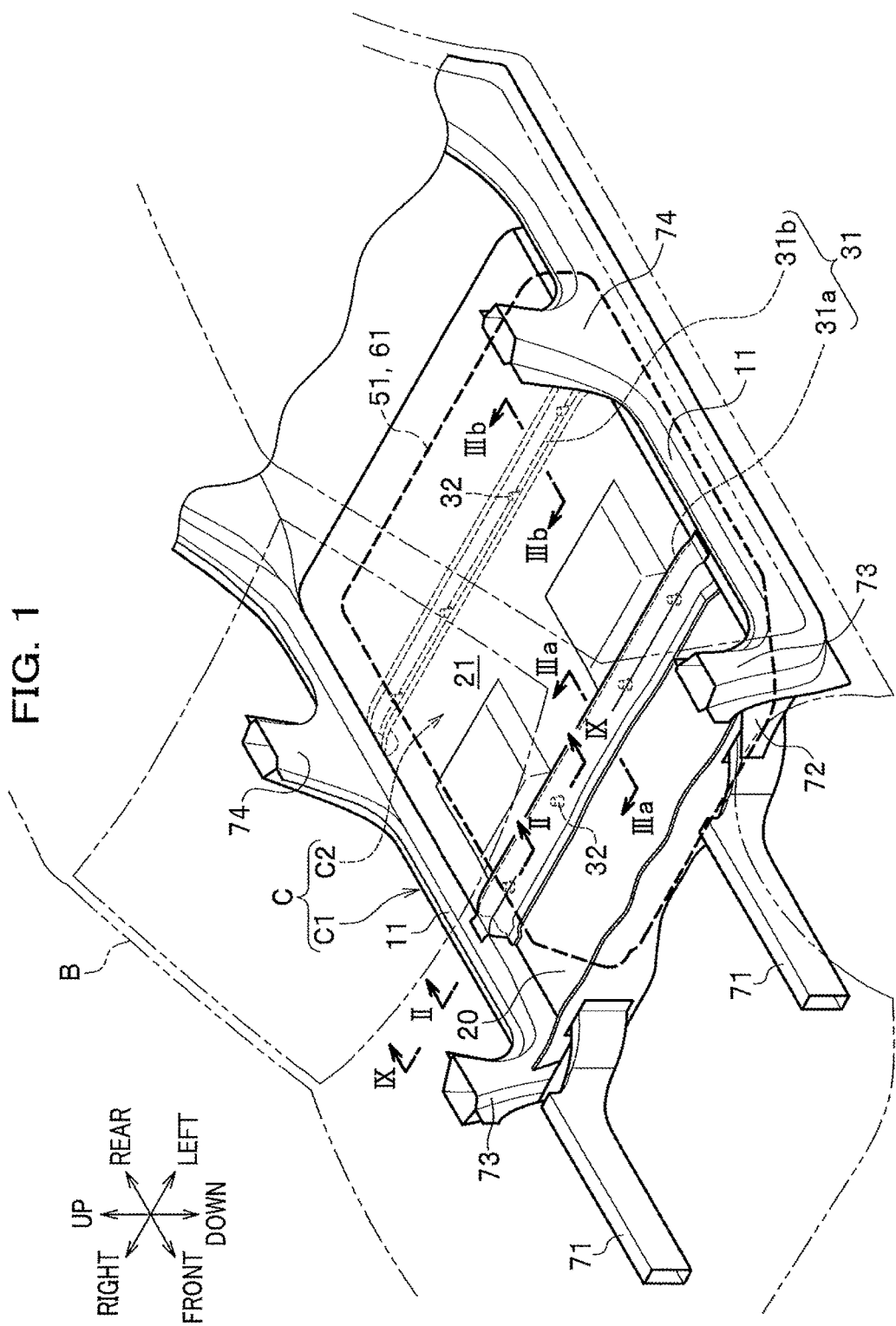
FIG. 1 is an overall perspective view of a vehicle body bottom structure according to an embodiment of the present invention.

FIG. 1 is an overall perspective view of a bottom structure C of a vehicle body B according to the present embodiment. In the following description, front, rear, left, right, up and down directions are directions as seen from a driver seated in a vehicle, and are based on the front, rear, left, right, up and down directions shown by arrows in FIG. 1. The left-right direction shown in FIG. 1 coincides with a width direction of the vehicle body B (hereinafter also referred to as a vehicle width direction), and the front-rear direction shown in FIG. 1 coincides with the front-rear direction of the vehicle body B (hereinafter also simply referred to as the front-rear direction).

As shown in FIG. 1, the bottom structure C of the vehicle body B according to the present embodiment includes a side sill structure C1 and a battery pack structure C2, and is excellent in transmitting a load inward in the vehicle width direction at a time of a side collision of the vehicle. A battery pack 51 and a battery side frame 61 constituting the battery pack structure C2 are arranged below a floor panel 21. In FIG. 1, the battery pack 51 and the battery side frame 61 are shown together by a hidden line (broken line) for convenience of drawing. In the following, the side sill structure C1 will be described first and then the battery pack structure C2 will be described.

<<Side Sill Structure>>

The side sill structure C1 of the present embodiment has a stiffener 41 (see FIG. 2) disposed in a hollow portion (inside a cross-section) of a side sill 11, wherein a first side surface 44a (see FIG. 2) inside in the vehicle width direction is shifted more upward than a second side surface 45a (see FIG. 2) outside in the vehicle width direction.

As shown in FIG. 1, the side sill structure C1 includes the side sill 11, a dashboard lower 20, the floor panel 21, and a floor cross member 31. In FIG. 1, the dashboard lower 20 breaks above a vicinity of a rear portion of a front side frame 71 and the upper broken portion is not shown for convenience of drawing. The side sill structure C1 further includes the stiffener 41 (see FIG. 2) described below which is disposed in the side sill 11. Incidentally, the side sill 11 as a component of the side sill structure C1 is also a constituent element of the battery pack structure C2 described in detail below.

<Side Sill>

The side sills 11 are hollow members elongated in the front-rear direction which are respectively arranged on both sides in the vehicle width direction. Front ends of the side sills 11 are respectively connected to rear portions of the front side frames 71 extending in the front-rear direction on both sides of a front portion of the vehicle body B. Specifically, the front ends of the side sills 11 are respectively connected to the front side frames 71 via outriggers 72 connected to rear side surfaces of the left and right front side frames 71. Incidentally, rear ends of the front side frames 71 are connected to the dashboard lower 20. In FIG. 1, reference numeral 32 denotes a fastening portion of a collar bolt 59 (see FIG. 2) described below. Reference numeral 73 denotes a front pillar integrally provided at a front portion of the side sill 11, and reference numeral 74 denotes a center pillar integrally provided at a center portion in the front-rear direction of the side sill 11.

Figure 2:
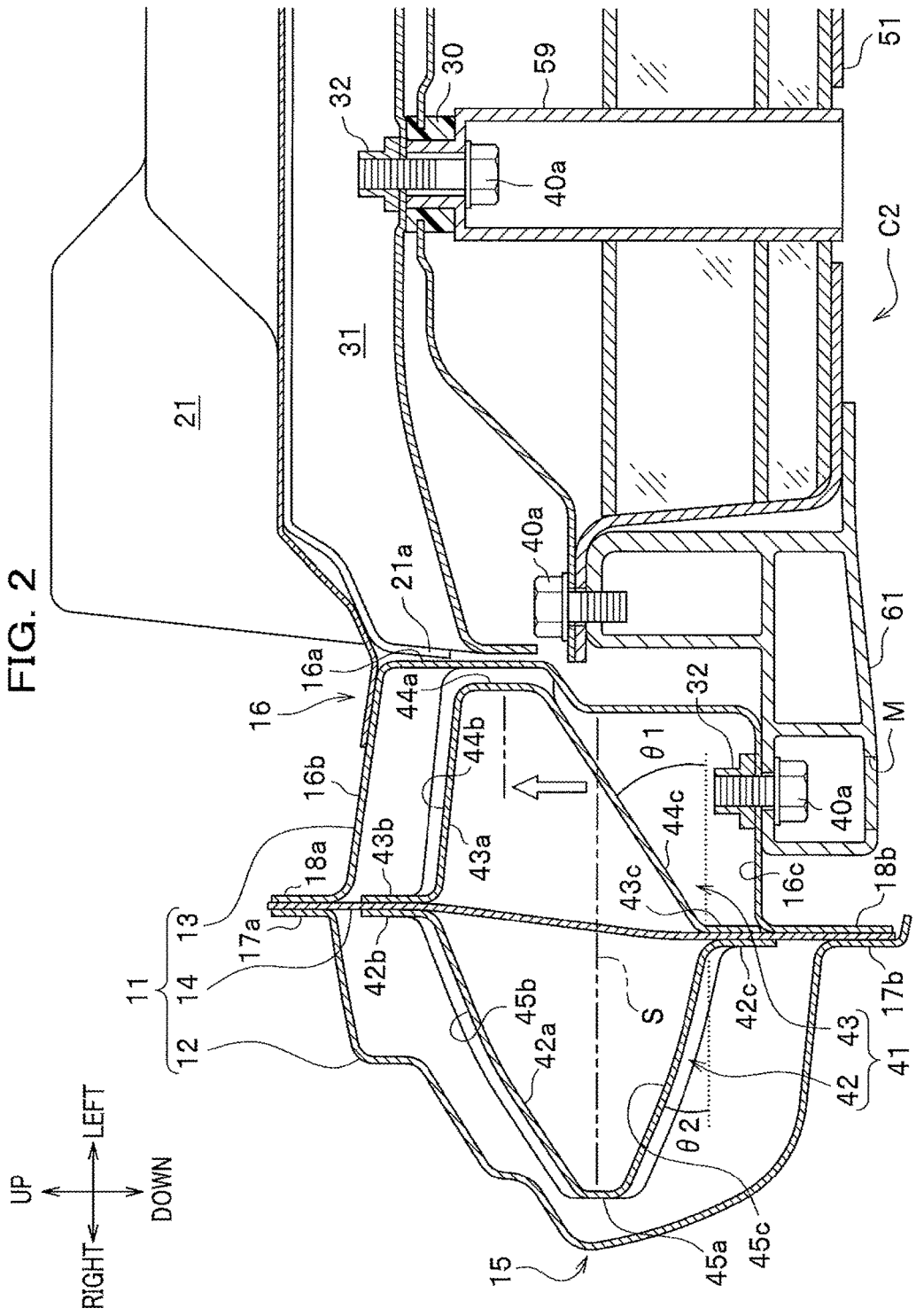
FIG. 2 is a cross-sectional view of a side sill structure, and is the cross-sectional view taken along a line II-II of FIG. 1.

FIG. 2 is a cross-sectional view of the side sill structure C1, and is the cross-sectional view taken along a line II-II of FIG. 1. As shown in FIG. 2, the side sill 11 includes an outer panel 12 disposed outside in the vehicle width direction, an inner panel 13 disposed inside in the vehicle width direction, and a support panel 14 for supporting the stiffener 41. The outer panel 12 includes a bulging portion 15 bulging outward in the vehicle width direction and flanges 17a, 17b respectively formed above and below the bulging portion 15. Incidentally, on an upper surface of the bulging portion 15, a step is formed corresponding to a shape of a lower end surface of a side door (not shown) mounted on the vehicle body B (see FIG. 1). A lower surface of the bulging portion 15 forms a gently curved surface convex outwardly. A side sill garnish made of resin is attached to the outside of the lower surface of the bulging portion 15 with a fastener such as a clip, but is omitted in FIG. 2.

The inner panel 13 includes a bulging portion 16 bulging inward in the vehicle width direction, and flanges 18a, 18b respectively formed above and below the bulging portion 16. Incidentally, a side surface of the bulging portion 16 is a facing surface 16a to the first side surface 44a of the stiffener 41 described below. A side end edge of the floor panel 21 and a side end of the floor cross member 31 are connected to the facing surface 16a. An upper surface of the bulging portion 16 is a facing surface 16b apart from a first upper surface 44b described below of the stiffener 41 by a predetermined distance.

A lower surface of the bulging portion 16 is formed with a support portion 16c for the battery side frame 61 described below which is a component of the battery pack structure C2. In the present embodiment, it is assumed that the battery side frame 61 is attached to the support portion 16c by screwing a bolt 40a inserted from an opening M of the battery side frame 61 to a fastening portion 32 formed by a plate nut provided on the support portion 16c.

The lower surface of the bulging portion 16 in this embodiment is a horizontal plane. Here, the "horizontal plane" is assumed to be a virtual plane parallel to a horizontal plane when the vehicle body B (see FIG. 1) is placed on a horizontal ground surface. The virtual plane is equal to, for example, a horizontal plane on which a reference plane of the floor panel 21 is placed taking a component member of the vehicle body B as a reference. The term "horizontal plane" in the following description is the same as the meaning of "horizontal plane" here.

The support panel 14 is a member for supporting the stiffener 41 disposed in the side sill 11 as described above. The support panel 14 is formed of a plate body which partitions the hollow portion of the side sill 11 inwardly and outwardly in the vehicle width direction.

The support panel 14 is inclined gradually displaced outward in the vehicle width direction as it goes downward in the hollow portion of the side sill 11, since a lower flange 42c of an outer stiffener 42 described below is displaced outward in the vehicle width direction than an upper flange 42b of the outer stiffener 42.

The side sill 11 is integrally formed by sandwiching upper and lower portions of the support panel 14 respectively between the flanges 17a, 17b of the outer panel 12 and the flanges 18a, 18b of the inner panel 13 and by mutually connecting them. Thus, the hollow portion of a closed cross-section inside the side sill 11 is partitioned by the support panel 14 as described above. It is assumed that the outer panel 12, the inner panel 13, and the support panel 14 in the present embodiment are formed of a so-called high-strength steel plate having, for example, a tensile strength of 270 MPa or more.

<Dashboard Lower>

As shown in FIG. 1, the dashboard lower 20 in the present embodiment defines a floor surface of a front portion in a vehicle compartment along with the floor panel 21 with a first floor cross member 31a described below as a boundary therebetween. The dashboard lower 20 extends obliquely upward and forward of the vehicle body to form a vertical wall partitioning the vehicle compartment and a power unit compartment. Incidentally, a cross member (not shown) extending in the vehicle width direction extends behind the vertical wall of the dashboard lower 20 in the present embodiment. A mounting member (not shown) or the like for fastening a rear portion of a subframe to a lower surface of the dashboard lower 20 reinforced with the cross member can be provided.

<Floor Panel>

As shown in FIG. 1, the floor panel 21 is formed of a plate body press-molded to correspond to a bulging structure formed on an upper surface of a battery pack 51 (see FIG. 10) described below. The floor panel 21 is disposed between left and right side sills 11, 11.

As shown in FIG. 2, the side end edge of the floor panel 21 is joined to the facing surface 16a of the inner panel 13 constituting the side sill 11 as described above. Specifically, a flange 21a formed at the side end edge of the floor panel 21 is connected to the inner panel 13 by welding or the like. In FIG. 2, the flange 21a of the floor panel 21 appears as an end surface indicated by a solid line in a hollow floor cross member 31 described below. Although not shown, the side end edge of the floor panel 21 may be joined to the side sill 11 via a strip-shaped plate body which is a separate member extending in the front-rear direction (a direction perpendicular to a paper surface of FIG. 2).

An insertion hole 21b of the collar bolt 59 described in detail below is formed in the floor panel 21. Incidentally, the collar bolt 59 attaches the battery pack 51 described below to the floor cross member 31. The insertion hole 21b is formed at a position corresponding to the fastening portion 32 of the floor cross member 31 to which the bolt 40a constituting the collar bolt 59 is screwed. In FIG. 2, reference numeral 30 denotes a grommet. It is assumed that the grommet 30 in the present embodiment is made of an elastic synthetic resin. The grommet 30 secures a space of a predetermined distance between the battery pack 51 and the floor cross member 31. The grommet 30 can give water tightness to the fastening portion 32. It should be noted that the collar bolt 59 may be a separate body of a collar and a bolt, or a stud bolt may be used.

It is assumed that the floor panel 21 in the present embodiment is formed of a steel plate having a lower strength than the outer panel 12 and the inner panel 13. Further, it is assumed that the strip-shaped plate body (not shown) is formed of a steel material, an aluminum alloy material or the like the same as the floor panel 21. However, materials of the floor panel 21 and the strip-shaped plate body is not limited thereto.

<Floor Cross Member>

As shown in FIG. 1, the floor cross member 31 is disposed to extend in the vehicle width direction between the left and right side sills 11 (between the stiffeners 41 (see FIG. 2) described below). The floor cross member 31 according to the present embodiment includes a first floor cross member 31a extending in the vehicle width direction between the dashboard lower 20 and the floor panel 21, and a second floor cross member 31b which is behind the first floor cross member 31a and extends along a lower surface of the floor panel 21. In FIG. 1, the second floor cross member 31b is indicated by a hidden line (broken line). In the following description, when it is not necessary to distinguish between the first floor cross member 31a and the second floor cross member 31b, it is simply referred to as the floor cross member 31.

Four fastening portions 32 described above are respectively formed in the first floor cross member 31a and the second floor cross member 31b. The fastening portion 32 is formed with a female thread into which the collar bolt 59 is screwed. The fastening portion 32 is formed of a plate nut and is indicated by a hidden line (broken line) in FIG. 1.

Figure 3A:
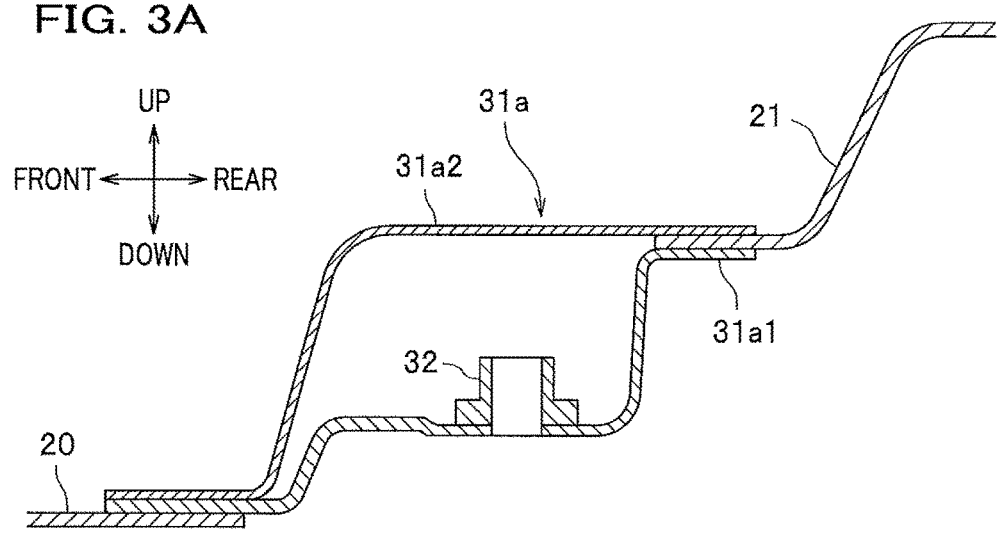
FIG. 3A is a cross-sectional view taken along a line IIIa-IIIa of a first floor cross member shown in FIG. 1.
Figure 3B:
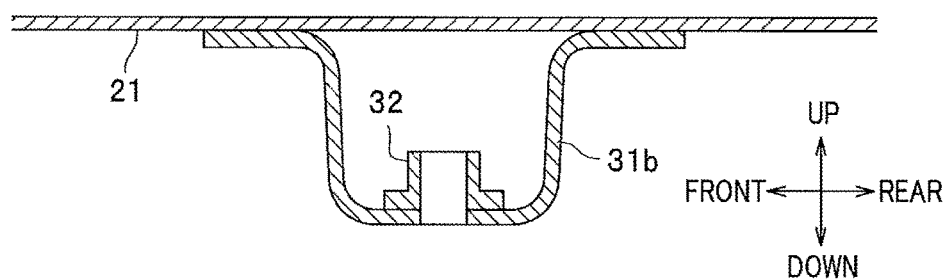
FIG. 3B is a cross-sectional view taken along a line of a second floor cross member shown in FIG. 1.

FIG. 3A is a cross-sectional view taken along a line IIIa-IIIa of the first floor cross member 31a shown in FIG. 1, and FIG. 3B is a cross-sectional view taken along a line IIIb-IIIb of the second floor cross member 31b shown in FIG. 1. As shown in FIG. 3A, the first floor cross member 31a is disposed to connect a front end edge of the floor panel 21 and a rear end edge of the dashboard lower 20. The first floor cross member 31a is formed by a lower half 31a1 having a plate nut forming the fastening portion 32 and an upper half 31a2 covering the lower half 31a1 from the above.

The lower half 31a1 in the present embodiment is formed stepwise to fill a height difference between the rear end edge of the dashboard lower 20 and the front end edge of the floor panel 21. A lower surface of the front end edge of the lower half 31a1 and an upper surface of the rear end edge of the dashboard lower 20 are joined together, and an upper surface of the rear end edge of the lower half 31a1 and a lower surface of the front end edge of the floor panel 21 are joined together.

The upper half 31a2 in the present embodiment is formed by a bent plate body having a substantially L-shaped cross-section. A front end edge of the upper half 31a2 is joined to the dashboard lower 20 with the lower half 31a1 therebetween, and a rear end edge of the upper half 31a2 is joined to the lower half 31a1 with the floor panel 21 therebetween. Thus, the first floor cross member 31a forms a closed cross-section between the lower half 31a1 and the upper half 31a2.

As shown in FIG. 3B, the second floor cross member 31b has a plate nut forming a fastening portion 32 in a hat-shaped central bulging portion in a cross-sectional view. The second floor cross member 31b is joined to the lower surface of the floor panel 21 by a flange corresponding to a brim of the hat-shaped portion. Thus, the second floor cross member 31b forms a closed cross-section with the floor panel 21. In FIGS. 3A and 3B, the collar bolt 59 (see FIG. 2) is fastened to the fastening portion 32.

The first floor cross member 31a and the second floor cross member 31b are connected to the inner panel 13 (see FIG. 2) of the side sill 11 (see FIG. 2) as described above through flanges (not shown) respectively formed at left and right ends thereof. Thus, the respective left and right ends of the first floor cross member 31a and the second floor cross member 31b are brought into contact with the facing surface 16a of the inner panel 13 constituting the side sill 11.

<Stiffener>

As shown in FIG. 2, the stiffener 41 is disposed in the hollow portion of the side sill 11. The stiffener 41 in the present embodiment includes the outer stiffener 42 disposed outside in the vehicle width direction and an inner stiffener 43 disposed inside in the vehicle width direction.

The outer stiffener 42 has a substantially hat-shaped cross-section bulging outward in the vehicle width direction. Specifically, a bulging portion 42a of the outer stiffener 42 has a substantially trapezoidal shape convex outward in the vehicle width direction in a cross-sectional view. The outer stiffener 42 forms a substantially hat-shaped cross-section including the upper flange 42b and the lower flange 42c respectively provided at upper and lower ends of the substantially trapezoidal shape. The substantially trapezoidal shape of the bulging portion 42a of the outer stiffener 42 is preferably an open leg trapezoid, and more preferably an open leg trapezoid (a substantially isosceles trapezoid) in which legs are opened at substantially equal angles with respect to a horizontal plane S as shown in FIG. 2.

The inner stiffener 43 has a substantially hat-shaped cross-section bulging inward in the vehicle width direction. Specifically, a bulging portion 43a of the inner stiffener 43 has a substantially trapezoidal shape convex inward in the vehicle width direction. The inner stiffener 43 forms a substantially hat-shaped cross-section including an upper flange 43b and a lower flange 43c respectively provided at upper and lower ends of the substantially trapezoidal shape.

In the stiffener 41 according to the present embodiment, the upper flange 42b of the outer stiffener 42 and the upper flange 43b of the inner stiffener 43 are joined together via the support panel 14. The lower flange 42c of the outer stiffener 42 and the lower flange 43c of the inner stiffener 43 are joined together via the support panel 14. Thus, the outer stiffener 42 and the inner stiffener 43 are integrated so that the stiffener 41 is configured to have a substantially hexagonal closed cross-section.

In the stiffener 41 according to the present embodiment, the inner stiffener 43 is formed with the first side surface 44a inside in the vehicle width direction thereof. In the stiffener 41, the inner stiffener 43 is formed with a first upper surface 44b and a first lower surface 44c, which correspond to legs of a substantially trapezoidal cross-section and vertically sandwich the first side surface 44a. In the stiffener 41 according to the present embodiment, the outer stiffener 42 is formed with the second side surface 45a outside in the vehicle width direction. In the stiffener 41, the outer stiffener 42 is formed with a second upper surface 45b and a second lower surface 45c, which correspond to legs of a substantially trapezoidal cross-section and vertically sandwich the second side surface 45a.

The first side surface 44a and the second side surface 45a of the stiffener 41 are opposed to each other, and are preferably disposed to be substantially parallel to each other. As described above, the first side surface 44a is shifted more upward than the second side surface 45a. Here, the term of "shifted more upward" means to allow not only a preferred embodiment in which an entire portion extending in a vertical direction of the first side surface 44a is positioned above the second side surface 45a, but also an embodiment in which at least a part of the entire portion extending in the vertical direction of the first side surface 44a is positioned above the second side surface 45a.

The first upper surface 44b of the stiffener 41 is preferably formed in a horizontal plane. The first lower surface 44c of the stiffener 41 is inclined from a lower joint portion between the inner stiffener 43 and the outer stiffener 42 toward a joint portion between the side sill 11 and the floor panel 21.

In the present embodiment, an angle θ1 formed by the first lower surface 44c of the stiffener 41 on a narrow angle side with respect to the horizontal plane is larger than an angle θ2 formed by the second lower surface 45c of the stiffener 41 on a narrow angle side with respect to the horizontal plane (θ1>θ2).

In the outer stiffener 42 according to the present embodiment, as described above, it is assumed that the second upper surface 45b and the second lower surface 45c corresponding to the legs of the substantially trapezoid are opened at substantially equal angles with respect to the horizontal plane S. It is also assumed that the second upper surface 45b is bent or curved so as to be slightly convex upward at a center thereof and the second lower surface 45c is bent or curved so as to be slightly convex downward at a center thereof.

Figure 4:
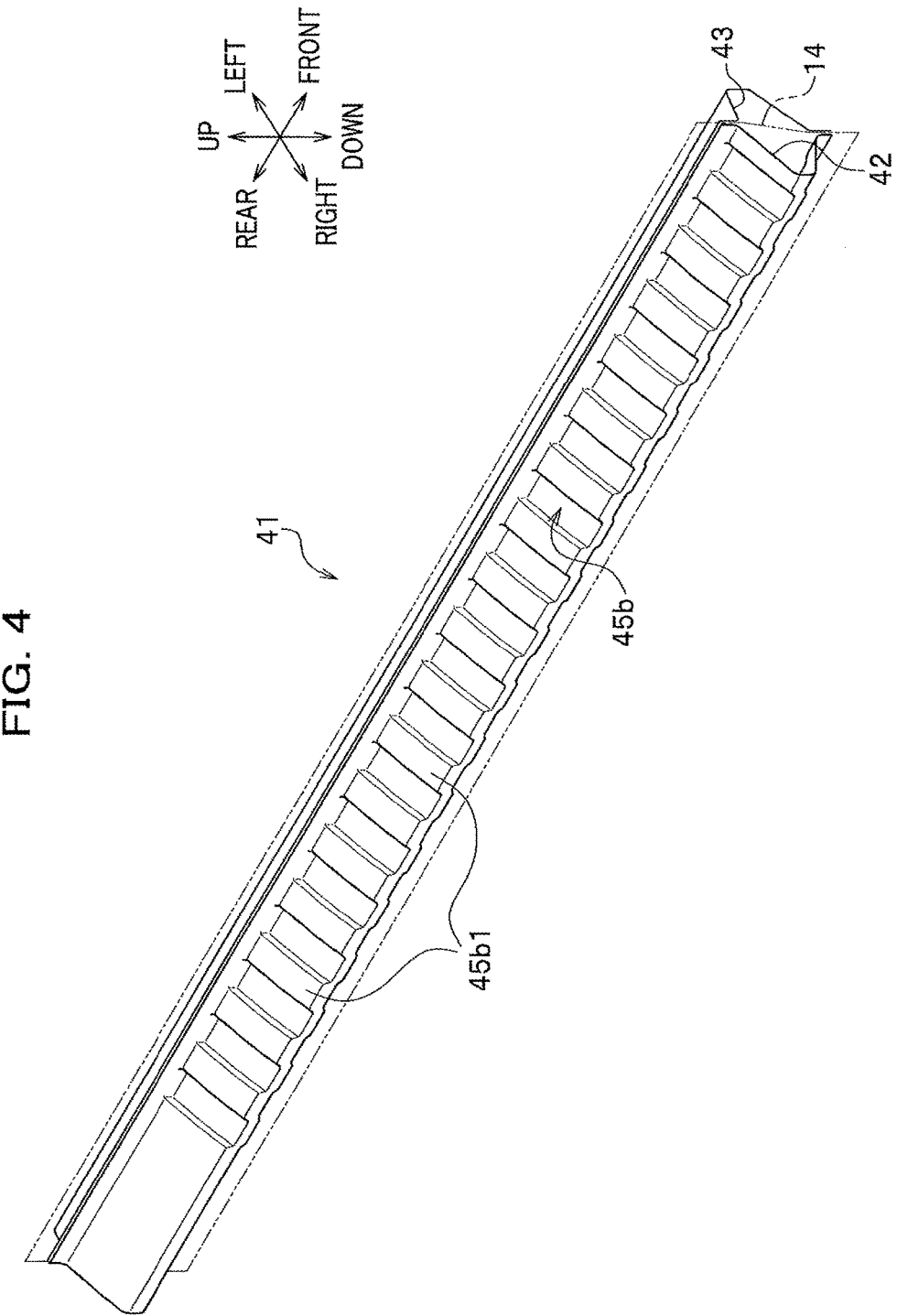
FIG. 4 is a partial perspective view showing a stiffener disposed in a left side sill of a vehicle body, viewed from an obliquely front upper side of the vehicle body.

FIG. 4 is a partial perspective view showing the stiffener 41 disposed in a left side sill 11 (see FIG. 1) of the vehicle body B (see FIG. 1), viewed from an obliquely front upper side of the vehicle body B (see FIG. 1). In FIG. 4, the outer panel 12 (see FIG. 2) and the inner panel 13 (see FIG. 2) of the side sill 11 (see FIG. 2) are omitted, and the support panel 14 of the side sill 11 is indicated by an imaginary line (a two-dot chain line).

As shown in FIG. 4, the outer stiffener 42 has a plurality of beads 45b1 on the second upper surface 45b. These beads 45b1 extend to intersect an extending direction of the stiffener 41 and are arranged side by side in the extending direction of the stiffener 41. Incidentally, the beads 45b1 in the present embodiment extend in a direction perpendicular to the extending direction of the stiffener 41 on the second upper surface 45b.

These beads 45b1 can be formed only on the second upper surface 45b, on both the second upper surface 45b and the second lower surface 45c, or only on the second lower surface 45c. Incidentally, in the present embodiment, it is assumed that the beads 45b1 are formed on both the second upper surface 45b and the second lower surface 45c. When the beads 45b1 are formed on both the second upper surface 45b and the second lower surface 45c, it is preferable that beads 45b1 are alternately arranged on the second upper surface 45b and on the second lower surface 45c.

Further, the beads 45b1 in the present embodiment are formed by corrugating a plate body forming the outer stiffener 42, but it is only required that a strip-shaped protrusion is formed on the surface of the outer stiffener 42, and a method of forming the beads 45b1 is not particularly limited. In FIG. 4, reference numeral 43 denotes an inner stiffener.

FIG. 5 is a partial perspective view showing the stiffener 41 disposed in the left side sill 11 (see FIG. 2) of the vehicle body B (see FIG. 1), viewed from the obliquely front upper side of the vehicle body B, in a positional relationship with the floor cross members 31. In FIG. 5, the outer panel 12 (see FIG. 2), the inner panel 13 (see FIG. 2), and the beads 45b1 (see FIG. 4) of the outer stiffener 42 of the side sill 11 (see FIG. 2) are omitted, and the support panel 14 of the side sill 11 is indicated by an imaginary line (a two-dot chain line).

As shown in FIG. 5, beads 44b1 extending to intersect the extending direction of the stiffener 41 are formed on the first upper surface 44b of the inner stiffener 43 at positions corresponding to ends in an extending direction of first and second floor cross members 31a, 31b. These beads 44b1 extend in the extending direction of the first and second floor cross members 31a, 31b, and the beads 44b1 in the present embodiment extend in the direction perpendicular to the extending direction of the stiffener 41. Plural rows of the beads 44b1 are respectively formed for the first and second floor cross members 31a, 31b. In this embodiment, the beads 44b1 are respectively formed in two rows for the first and second floor cross members 31a, 31b so as to be aligned with both edges in the front-rear direction of the respective floor cross members 31a, 31b.

The bead 44b1 is not formed in the inner stiffener 43 at the first upper surface 44b between the first and second floor cross members 31a, 31b. In FIG. 5, reference numeral 42 denotes the outer stiffener.

Next, operational effects of the side sill structure C1 will be described. In the side sill structure C1 according to the present embodiment, the first side surface 44a of the stiffener 41 is shifted more upward than the second side surface 45a. According to the side sill structure C1, a collision load is well transmitted to the floor cross member 31 through the side sill 11 at the time of the side collision of the vehicle.

In the side sill structure C1 according to the present embodiment, the battery pack 51 is supported on a lower surface of the side sill 11 (inner panel 13) via the battery side frame 61. According to such a side sill structure C1, since the inner stiffener 43 does not interfere with a support point of the battery pack 51, layout property of supporting the battery pack 51 is improved.

In the side sill structure C1 according to the present embodiment, the outer stiffener 42 has a substantially isosceles trapezoidal cross-sectional shape, and the second upper surface 45b and the second lower surface 45c corresponding to the substantially isosceles trapezoidal legs are slightly bent or curved outwardly.

FIGS. 6A to 6C to be referred next are conceptual diagrams showing how the outer stiffener 42 of the present embodiment is deformed upon the side collision, and FIGS. 6D to 6F and FIGS. 6G to 6I are reference diagrams contrasting with FIGS. 6A to 6C. When an object Ob side-collides with the outer stiffener 42 in the present embodiment shown in FIG. 6A, as shown in FIG. 6B, the outer stiffener 42 deforms such that bent portions or curved portions in the substantially isosceles trapezoidal legs project outwardly. Then, as shown in FIG. 6C, the substantially isosceles trapezoidal legs form standing legs substantially perpendicular to the support panel 14 of the side sill 11. Thus, the outer stiffener 42 efficiently transmits the load at the time of the side collision inward in the vehicle width direction.

In contrast, in the outer stiffener 42 shown in FIG. 6D as a reference example, one of the substantially trapezoidal legs stands substantially perpendicular to the support panel 14 of the side sill 11. When the load at the time of the side collision is transmitted to such an outer stiffener 42, as shown in FIG. 6E, the outer stiffener 42 is bent at the leg substantially perpendicular to the support panel 14. As a result, the outer stiffener 42 collapses on a surface of the support panel 14 as shown in FIG. 6F. That is, the outer stiffener 42 may not sufficiently transmit the load inward in the vehicle width direction.

In the outer stiffener 42 shown in FIG. 6G as a reference example, the substantially isosceles trapezoidal legs are flat without being bent or curved. When the load at the time of the side collision is transmitted to such an outer stiffener 42, as shown in FIG. 6H, the legs bend in a direction of closing the cross-section of the outer stiffener 42. As a result, the outer stiffener 42 buckles on the surface of the support panel 14 as shown in FIG. 6I. Therefore, the outer stiffener 42 may not sufficiently transmit the load inward in the vehicle width direction. As described above, the outer stiffener 42 (see FIG. 6A) of the substantially isosceles trapezoidal shape according to the present embodiment transmits the load at the time of the side collision better than other outer stiffeners 42 (see FIGS. 6D, 6G) of the reference examples.

In the side sill structure C1 according to the present embodiment, the angle $\theta 1$ formed by the first lower surface 44c (lower surface of the inner stiffener 43) of the stiffener 41 on a narrow angle side with respect to the horizontal plane is set larger than the angle $\theta 2$ formed by the second lower surface 45c (lower surface of the outer stiffener 42) of the stiffener 41 on a narrow angle side with respect to the horizontal plane ($\theta 1 > \theta 2$). According to such a side sill structure C1, an inclination angle of the lower surface of the inner stiffener 43 is sharp, and thus the collision load is well transmitted to the floor cross member 31 through the side sill 11.

In the side sill structure C1 according to the present embodiment, at least one surface of the second upper surface 45b (upper surface of the outer stiffener 42) of the stiffener 41 and the second lower surface 45c (lower surface of the outer stiffener 42) of the stiffener 41 is formed with beads 45b1. According to the side sill structure C1, the collision load is well transmitted to the floor cross member 31 through the side sill 11 by the beads 45b1.

In the side sill structure C1 according to the present embodiment, the inner stiffener 43 includes the beads 44b1 extending in the vehicle width direction at the positions corresponding to the ends in the extending direction of the floor cross member 31. According to the side sill structure C1, the collision load is well transmitted to the floor cross member 31 through the side sill 11 by the beads 44b1.

In the side sill structure C1 according to the present embodiment, the beads 44b1 of the inner stiffener 43 are respectively formed in two rows only at the positions corresponding to the ends in the extending direction of the first and second floor cross members 31a, 31b. The bead 44b1 is not formed in the inner stiffener 43 at a position between the first and second floor cross members 31a, 31b.

According to the side sill structure C1, an amount of intrusion inward in the vehicle width direction at the time of the side collision of the vehicle can be reduced as follows. FIGS. 7A and 7B are conceptual diagrams showing deformation of the stiffener 41 when the load at the time of the side collision is input from the object Ob to the stiffener 41 in which the outer stiffener 42 has the beads 45b1 and the inner stiffener 43 does not have the bead 44b1. FIGS. 8A and 8B are conceptual diagrams showing deformation of the stiffener 41 when the load at the time of the side collision is input from the object Ob to the stiffener 41 in which the outer stiffener 42 has the beads 45b1 and the inner stiffener 43 partially has the beads 44b1.

As shown in FIGS. 7A to 7B, when the load at the time of the side collision is input to the stiffener 41 from the object Ob, crushing of the stiffener 41 progresses between the first floor cross member 31a and the second floor cross member 31b. At this time, the beads 45b1 of the outer stiffener 42 can increase the load to crush the outer stiffener 42 at the time of the side collision. This makes it possible to increase absorption efficiency of collision energy.

As shown in FIGS. 8A to 8B, when a load at the time of the side collision is input to the stiffener 41 from the object Ob, crushing of the stiffener 41 progresses because the inner stiffener 43 does not have the bead 44b1 between the first floor cross member 31a and the second floor cross member 31b. On the other hand, the bead 44b1 are formed in the inner stiffener 43 at portions corresponding to the first floor cross member 31a and the second floor cross member 31b. Thus, crushing due to the input load is suppressed at the portions of the inner stiffener 43 having the beads 44b1, and the collision load is efficiently transmitted to the first floor cross member 31a and the second floor cross member 31b. That is, according to the stiffener 41 shown in FIG. 8A, firstly it is possible to transmit the load at the time of the side collision through the side sill 11 (see FIG. 1) to the first floor cross member 31a and the second floor cross member 31b. According to the stiffener 41, secondly it is possible to reduce an amount of intrusion into the battery pack 51 by crushing the side sill 11 (stiffener 41). That is, according to the stiffener 41, it is possible to satisfy these contradictory first and second characteristics at the time of the side collision.

<<Battery Pack Structure>>

Next, the battery pack structure C2 (see FIG. 1) of the present embodiment will be described. The battery pack structure C2 is mainly characterized in that the battery side frame 61 has a lower surface 61c (see FIG. 13) located on the outside in the vehicle width direction and positioned lower than a support portion 61b (see FIG. 13) for the battery pack 51 (see FIG. 13), the support portion 61b being formed inside in the vehicle width direction of the battery side frame 61 (see FIG. 13).

Figure 9:
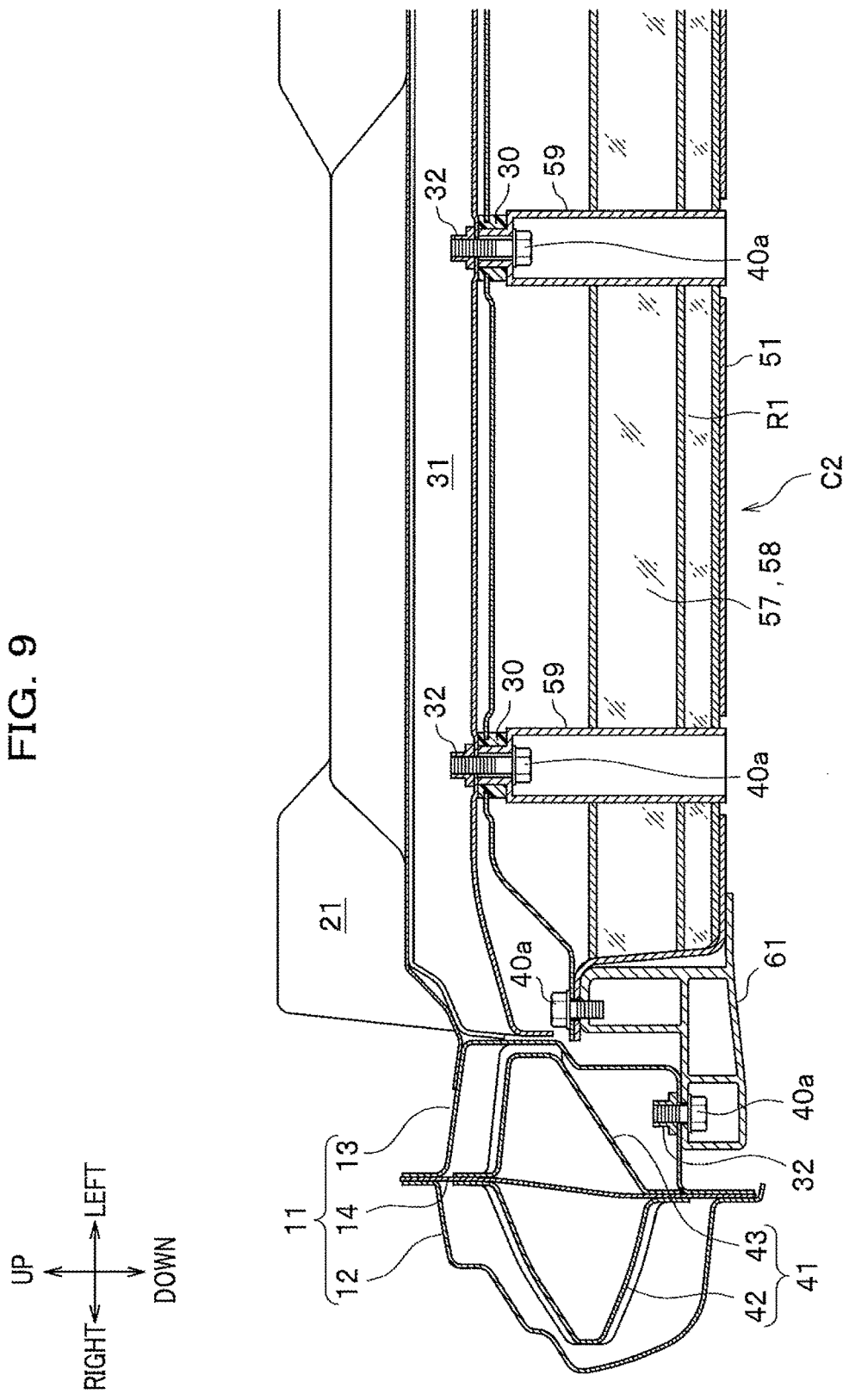
FIG. 9 is a partial cross-sectional view of a battery pack structure and is the cross-sectional view taken along a line IX-IX of FIG. 1.

FIG. 9 is a partial cross-sectional view of the battery pack structure C2 and is the cross-sectional view taken along a line IX-IX of FIG. 1. As shown in FIG. 9, the battery pack structure C2 includes the side sill 11, the battery pack 51 and the battery side frame 61 described above. As described above, the battery pack 51 is disposed below the floor panel 21, and is fastened to the floor cross member 31 extending in the vehicle width direction on the floor panel 21 by the collar bolt 59. As described above, the space of the predetermined interval is formed between the battery pack 51 and the floor cross member 31 by the grommet 30. The battery pack 51 is fastened to the battery side frame 61 by the bolt 40a. The battery side frame 61 and the side sill 11 are joined together by the fastening portion 32 composed of the bolt 40a and the plate nut.

In FIG. 9, reference numeral 12 denotes the outer panel, reference numeral 13 denotes the inner panel, and reference numeral 14 denotes the support panel. Reference numeral 41 denotes the stiffener composed of the outer stiffener 42 and the inner stiffener 43. Reference numeral 58 denotes a battery cross member of a battery frame 57 constituting the battery pack 51, and reference numeral R1 denotes a rib of the battery cross member 58 described below. The battery pack 51 and the battery side frame 61 will be described in more detail below.

<Battery Pack>

Figure 10:
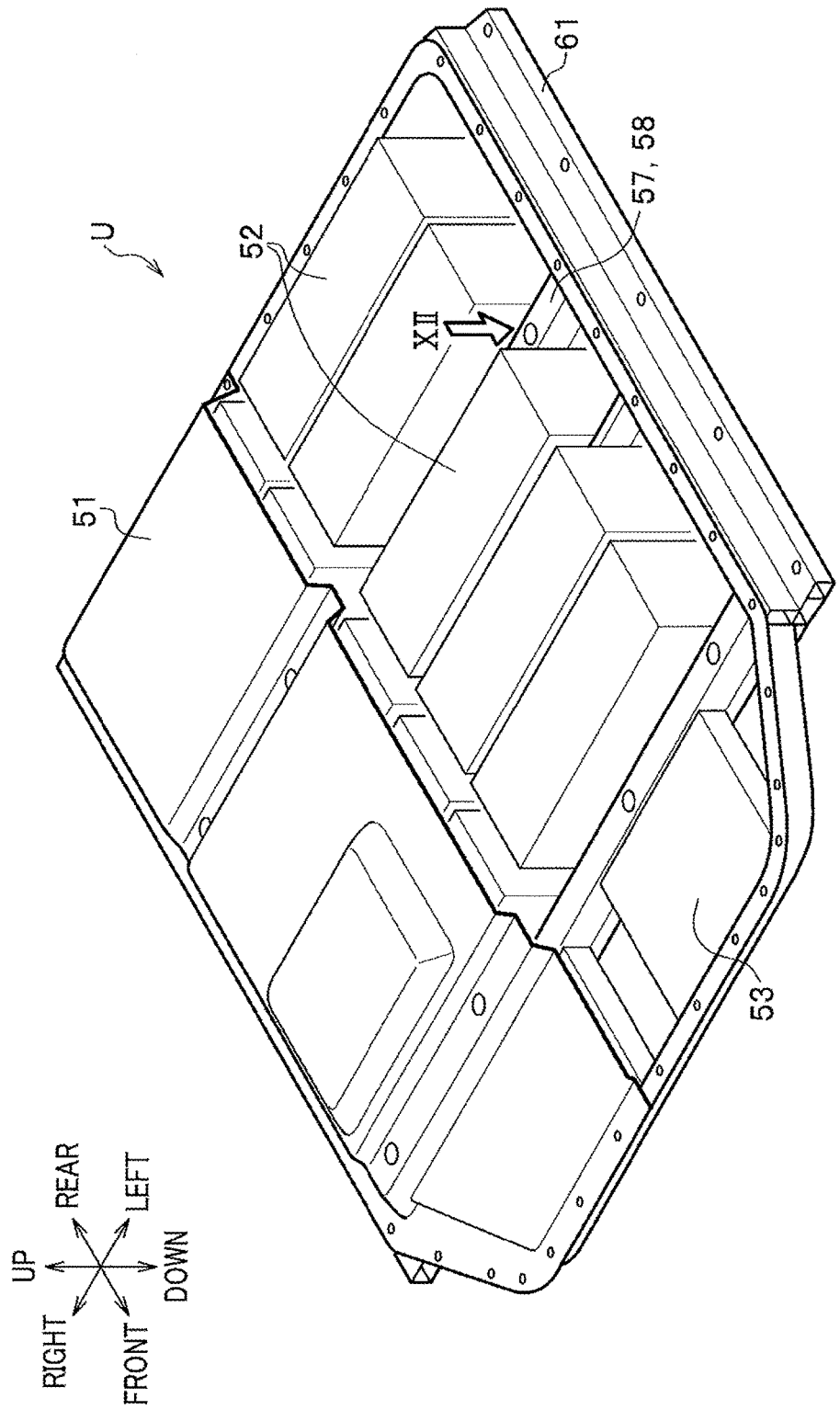
FIG. 10 is a perspective view of a battery pack unit with a battery side frame attached to a battery pack, and is a view showing an internal structure of the battery pack by partially cutting out an upper portion of the battery pack.

FIG. 10 is a perspective view of a battery pack unit U with the battery side frame 61 attached to the battery pack 51, and is a view showing an internal structure of the battery pack 51 by partially cutting out an upper portion of the battery pack 51.

As shown in FIG. 10, the battery pack 51 has a substantially rectangular parallelepiped shape that is thin in the vertical direction. A plurality of battery modules 52 are arranged aligned in front, rear, left and right inside the battery pack 51. The battery module 52 includes, for example, a lithium ion secondary battery. An electrical accessory component group 53 including, for example, a junction board and a DC-DC converter is arranged inside the battery pack 51. Although not shown, for example, a cooling device having a blower mechanism is also disposed inside the battery pack 51. The battery module 52, the electrical accessory component group 53, the cooling device and the like are supported in the battery pack 51 via the battery frame 57 described in detail below. In FIG. 10, reference numeral 58 denotes the battery cross member constituting the battery frame 57.

Figure 11:
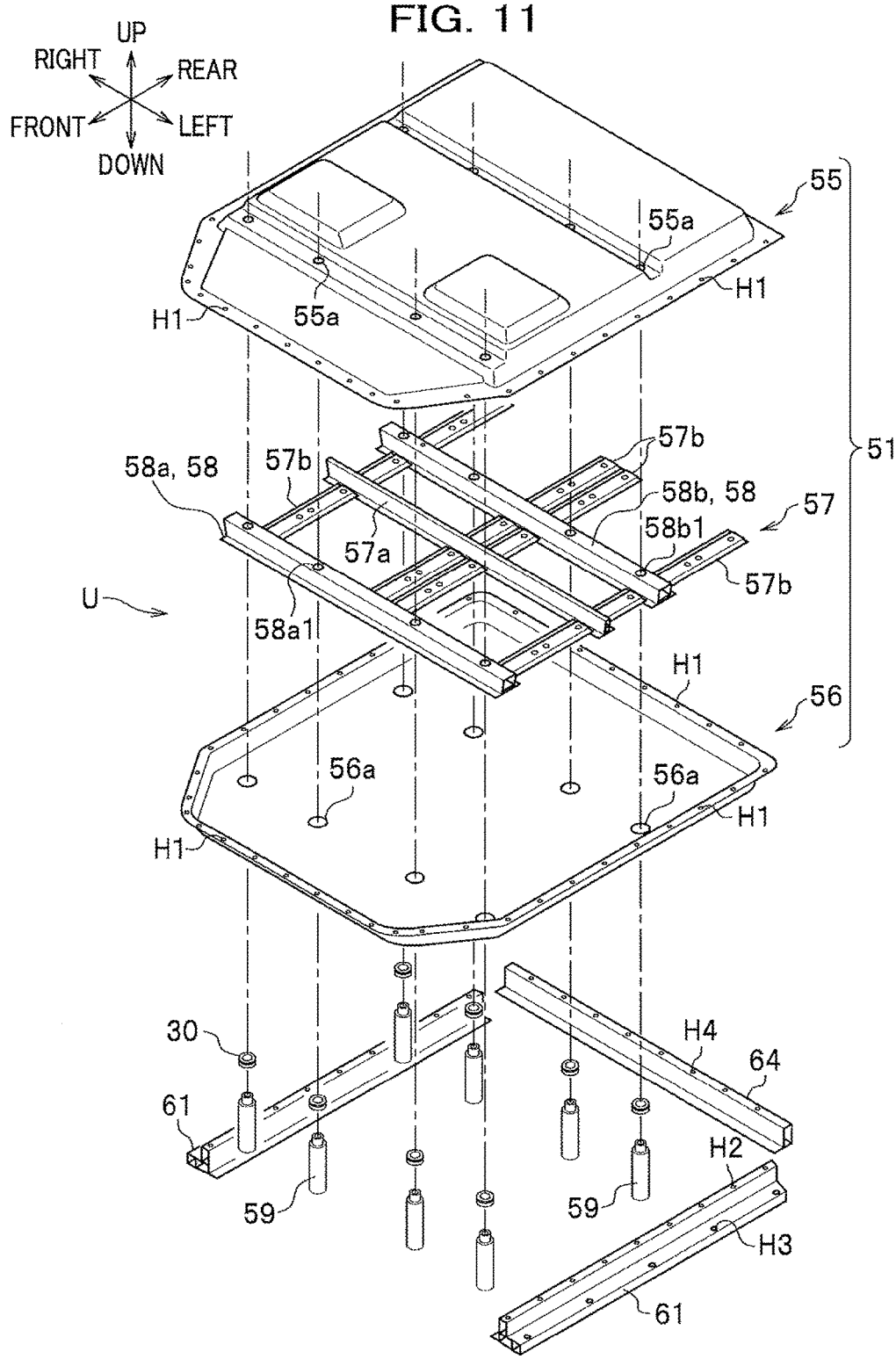
FIG. 11 is an exploded perspective view of the battery pack unit of FIG. 10.

FIG. 11 is an exploded perspective view of the battery pack unit U of FIG. 10. As shown in FIG. 11, the battery pack 51 includes a battery cover 55, a battery tray 56 and the battery frame 57. Although not shown in FIG. 11, the battery pack 51 further includes the battery module 52, the electrical accessory component group 53, the cooling device and the like.

The battery cover 55 forms an outer shape of an upper half of the battery pack 51. The battery cover 55 in the present embodiment is formed with a press-formed plate body. The battery cover 55 has a bulged structure in which the plate body partially bulges corresponding to an upper surface shape of a structure such as the battery module 52 (see FIG. 10) arranged in the battery pack 51.

The battery cover 55 is formed with a plurality of insertion holes 55a through which the collar bolts 59 are inserted. The grommets 30 are respectively arranged in the insertion holes 55a. Thus, the battery cover 55 and the floor cross member 31 are separated by the predetermined distance as described above. The insertion holes 55a are provided at positions corresponding to the fastening portions 32 (see FIG. 1) formed in the first floor cross member 31a (see FIG. 1) and the second floor cross member 31b (see FIG. 1).

The battery tray 56 forms an outer shape of a lower half of the battery pack 51. The battery tray 56 has substantially the same planar shape as the battery cover 55. The battery tray 56 forms a casing of the battery pack 51 which houses therein the battery module 52 and the like along with the battery cover 55. Insertion holes 56a for the colored bolts 59 are formed in the battery tray 56 at positions corresponding to the insertion holes 55a of the battery cover 55.

A plurality of through-holes H1 are formed in peripheral portions of the battery cover 55 and the battery tray 56. The through-holes H1 are formed at positions corresponding to each other in both the battery cover 55 and the battery tray 56. Bolts (not shown) for fastening the battery cover 55 and the battery tray 56 to each other are inserted into the through-holes H1 when the battery cover 55 and the battery tray 56 are closed to form the casing.

The battery frame 57 includes the battery cross member 58 extending in the vehicle width direction in the battery pack 51. The battery cross member 58 in the present embodiment includes a first battery cross member 58a extending in the vehicle width direction at a front portion of the battery pack 51 and a second battery cross member 58b extending in the vehicle width direction behind the first battery cross member 58a. In the following description, when it is not necessary to distinguish between the first battery cross member 58a and the second battery cross member 58b, it is simply referred to as the battery cross member 58.

Insertion holes 58a1 for the collar bolts 59 are formed in the first battery cross member 58a. The insertion holes 58a1 are respectively formed at positions corresponding to the fastening portions 32 (see FIG. 1) of the first floor cross member 31a (see FIG. 1).

Insertion holes 58b1 for the collar bolts 59 are formed in the second battery cross member 58b. The insertion holes 58b1 are respectively formed at positions corresponding to the fastening portions 32 (see FIG. 1) of the second floor cross member 31b (see FIG. 1). The battery cross member 58 is formed with the rib R1 (see FIG. 12) extending in the vehicle width direction inside a cross-section thereof as described below.

The battery frame 57 further includes a battery center cross member 5a extending in the vehicle width direction between the first battery cross member 58a and the second battery cross member 58b. The battery frame 57 further includes four connecting members 57b extending in the front-rear direction to connect the first battery cross member

58a, the second battery cross member 58b, and the battery center cross member 5a to each other. Incidentally, two of the four connecting members 57b are respectively arranged on the left and right in the battery pack 51. The other two are arranged side by side in the center in the vehicle width direction in the battery pack 51.

<Battery Side Frame>

As shown in FIG. 9, the battery side frame 61 is disposed between the side sill 11 and the battery pack 51. Further, as shown in FIG. 10, the battery side frame 61 extends in the front-rear direction along an outer side in the vehicle width direction of the battery pack 51.

As shown in FIG. 11, the battery side frame 61 is formed with threaded holes H2 into which bolts (not shown) to be inserted through the through-holes H1 formed on the left and right of the battery cover 55 and the battery tray 56 are screwed. The battery side frame 61 is formed with insertion holes H3 for bolts 40a (see FIG. 2) for fastening the battery side frame 61 to the support portion 16c (see FIG. 2) of the side sill 11 (see FIG. 2).

In FIG. 11, reference numeral 64 denotes a cross beam extending in the vehicle width direction between rear ends of left and right battery side frames 61, 61. The cross beam 64 is formed with threaded holes H4 into which bolts (not shown) to be inserted through the through-holes H1 formed in rear portions of the battery cover 55 and the battery tray 56 are screwed.

Figure 12:
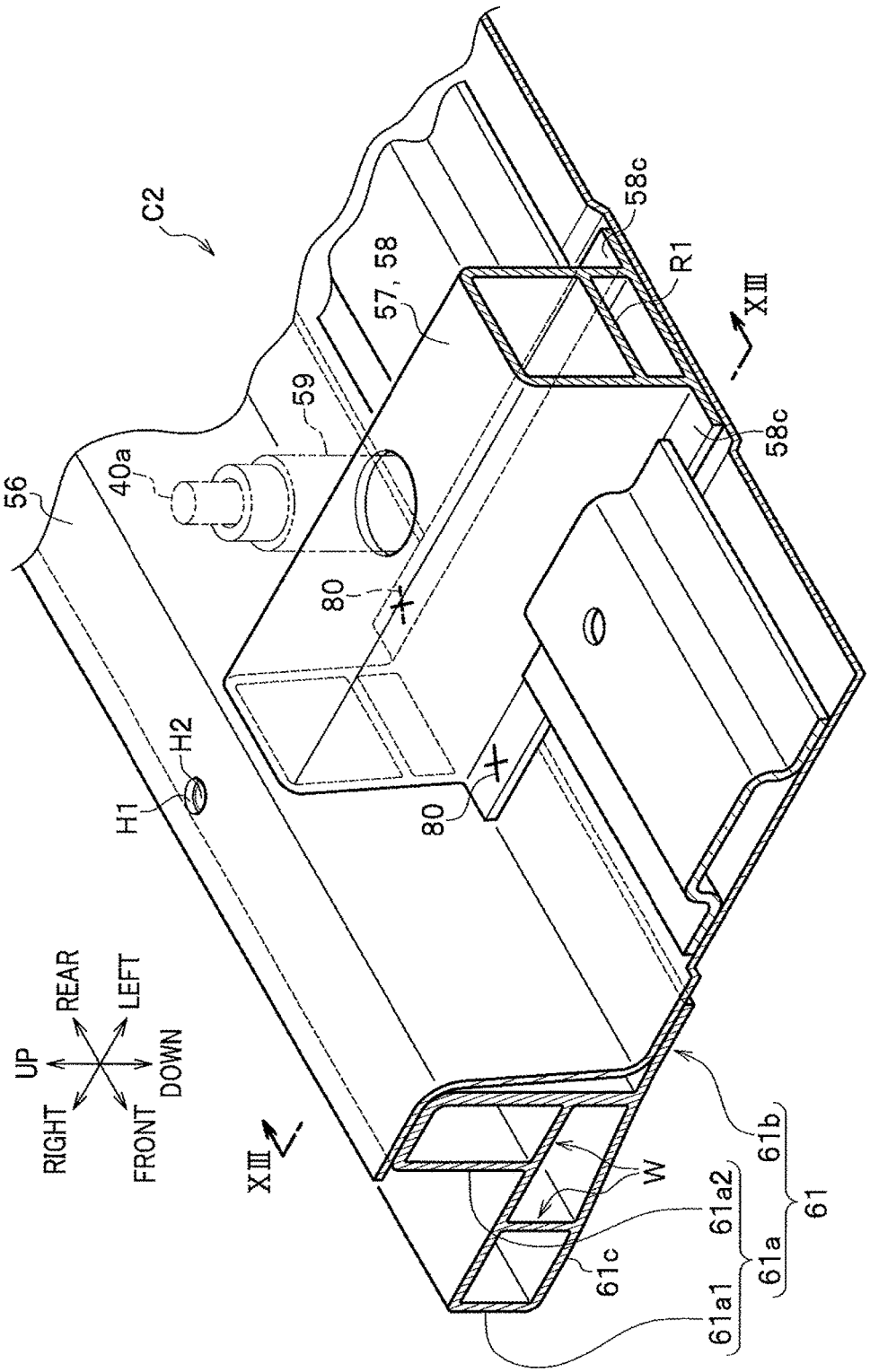
FIG. 12 is a partial perspective view showing a joining relationship between the battery side frame, a battery tray and a battery cross member in a direction indicated by an arrow XII in FIG. 10, and a view showing a vicinity of the arrow XII viewed from obliquely upper right rear.

FIG. 12 to be referred to next is a partial perspective view showing a joining relationship between the battery side frame 61, the battery tray 56 and the battery cross member 58 in a direction indicated by an arrow XII in FIG. 10, and a view showing a vicinity of the arrow XII viewed from obliquely upper right rear. Further, FIG. 12 includes cross-sectional views of the battery side frame 61, the battery tray 56 and the battery cross member 58.

As shown in FIG. 12, the battery side frame 61 includes a block portion 61a having a hollow portion partitioned by a plurality of partition walls W and having an L-shaped cross-section, and the support portion 61b for the battery pack 51 (see FIG. 9) formed of a rib further extending inward in the vehicle width direction from a lower end on an inner side (a left side in FIG. 12) in the vehicle width direction of the battery pack 51 (see FIG. 9).

The block portion 61a forms the L-shaped cross-section by a base portion 61a1 and a vertical wall portion 61a2 rising substantially vertically from the base portion 61a1. The insertion holes H3 (see FIG. 11) for the bolts 40a (see FIG. 2) are formed on an upper surface of the base portion 61a1. The threaded holes H2 (see FIG. 11) into which the bolts 40a (see FIG. 2) are screwed are formed on an upper surface of the vertical wall portion 61a2. In FIG. 12, reference numeral H1 denotes the through-hole H1 formed in the battery tray 56.

An end surface in the vehicle width direction of the battery cross member 58 constituting the battery frame 57 faces an inner side surface in the vehicle width direction of the battery side frame 61 via the battery tray 56. As described above, the battery cross member 58 according to the present embodiment has the rib R1 extending in the vehicle width direction inside the cross-section thereof. Specifically, the battery cross member 58 has a rectangular closed cross-section having a hollow portion, and the rib R1 extends substantially horizontally to vertically partition the hollow portion of the battery cross member 58. The rib R1 is formed with an insertion hole (not shown) for the collar bolt 59 in a portion where the colored bolt 59 passes through the battery cross member 58. In FIG. 12, reference numerals 58c denote flanges of the battery cross member 58, and reference numerals 80 denote fastening points of the battery cross member 58 to the battery side frame 61.

Figure 13:
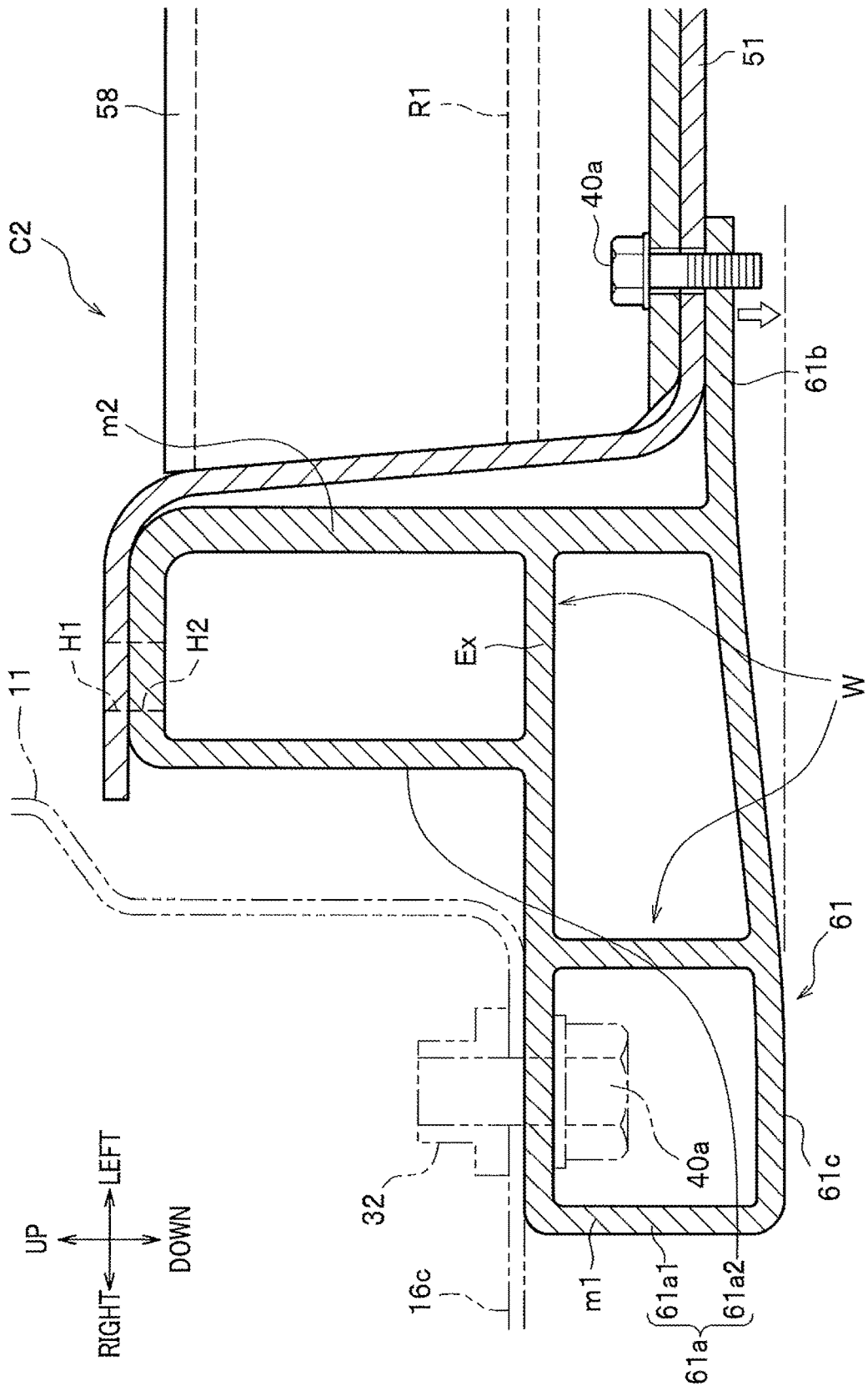
FIG. 13 is a cross-sectional view taken along a line XIII-XIII of FIG. 12.

FIG. 13 is a cross-sectional view taken along a line XIII-XIII of FIG. 12. Further, in FIG. 13, the support portion 16c of the side sill 11 for the battery side frame 61 is drawn with imaginary lines (two-dot chain lines). As shown in FIG. 13, in the battery pack structure C2 of the present embodiment, the battery side frame 61 has the lower surface 61c positioned outside in the vehicle width direction and positioned lower than the support portion 61b for the battery pack 51, the support portion 61b being formed inside in the vehicle width direction of the battery side frame 61.

In the battery pack structure C2 of the present embodiment, the rib R1 of the battery cross member 58 extends in the vehicle width direction. The support portion 16c formed on the side sill 11 for the battery side frame 61 is set at a position overlapping an extended line in an extending direction of the rib R1.

In the battery pack structure C2 of the present embodiment, a horizontally extending partition wall W of the partition walls W partitioning the hollow portion of the battery side frame 61 constitutes an extending portion Ex extending inward in the vehicle width direction from the support portion 16c. The extending portion Ex is formed at a position overlapping the extended line in the extending direction of the rib R1.

In the battery pack structure C2 of the present embodiment, the support portion 61b of the battery side frame 61 for the battery pack 51 and the battery cross member 58 are connected to each other in the vertical direction by the bolts 40a.

In the battery pack structure C2 of the present embodiment, the battery side frame 61 has a higher strength on an inside in the vehicle width direction thereof than that on an outside in the vehicle width direction thereof. Specifically, a component member m2 of the battery side frame 61 disposed inside in the vehicle width direction of the battery side frame 61 is thicker than a component member m1 disposed outside in the vehicle width direction thereof.

Incidentally, a difference in strength between the inside in the vehicle width direction and the outside in the vehicle width direction of the battery side frame 61 is not limited to a difference in thickness of the component member. Therefore, the difference in strength between the inside in the width direction and the outside in the width direction of the battery side frame 61 can also be set by using two or more component members having different strengths. Further, such a difference in strength can also be set by reinforcing the inside in the vehicle width direction of the battery side frame 61. Although there is no particular limitation on a mode of reinforcement, the reinforcement includes, for example, application of a hard film to a surface of the battery side frame 61 in addition to reinforcement by a three-dimensional structure such as ribs and grooves. Such a difference in strength can be set stepwise from the inside in the width direction to the outside in the width direction of the battery side frame 61, or it can be set so that the strength gradually increases from the outside in the width direction to the inside in the width direction thereof.

Next, operational effects of the battery pack structure C2 will be described. In the battery pack structure C2 of the present embodiment, the lower surface 61c of the battery side frame 61 positioned on the outside in the vehicle width direction is positioned lower than the support portion 61b for the battery pack 51. According to such a battery pack structure C2, it is possible to reduce force of the battery side frame 61 going to bend upward due to the load input at the time of the side collision.

Figure 14A:
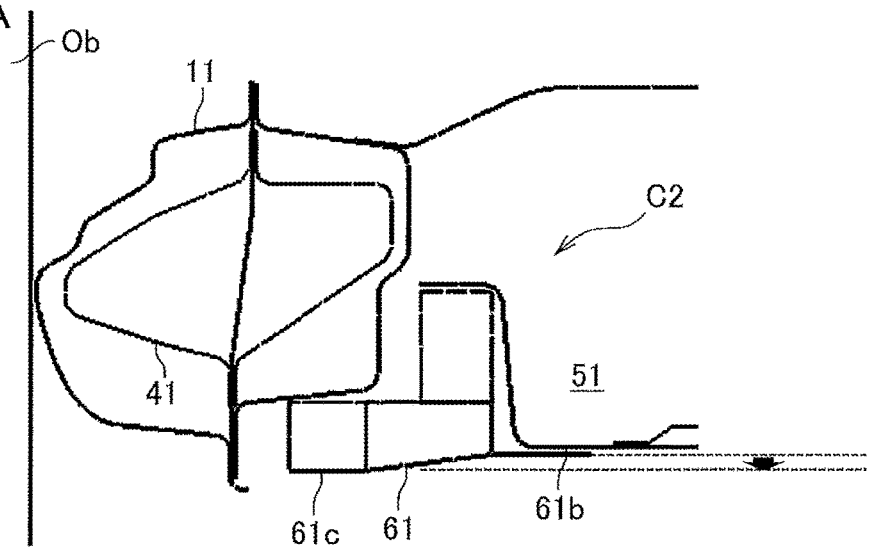
FIGS. 14A to 14C are conceptual diagrams showing how the battery side frame is deformed when the load at the time of the side collision is applied to the battery pack structure according to the embodiment of the present invention.
Figure 14B:
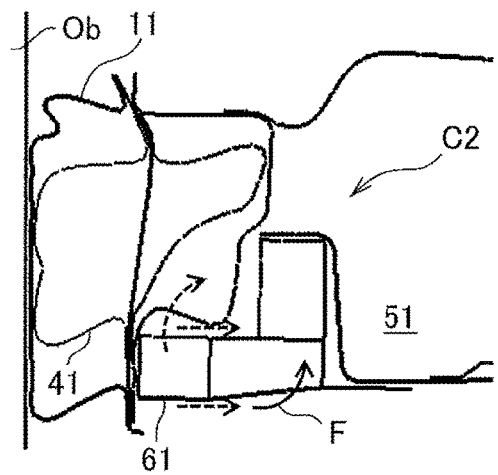
Figure 14C:
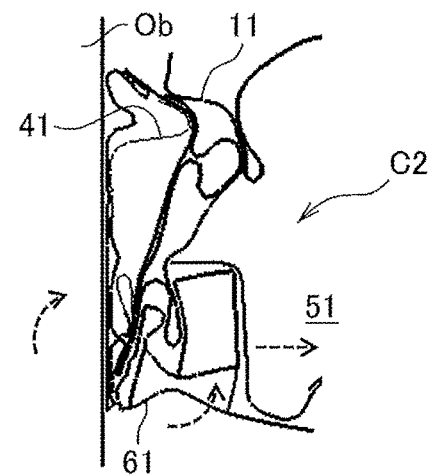
Figure 15A:
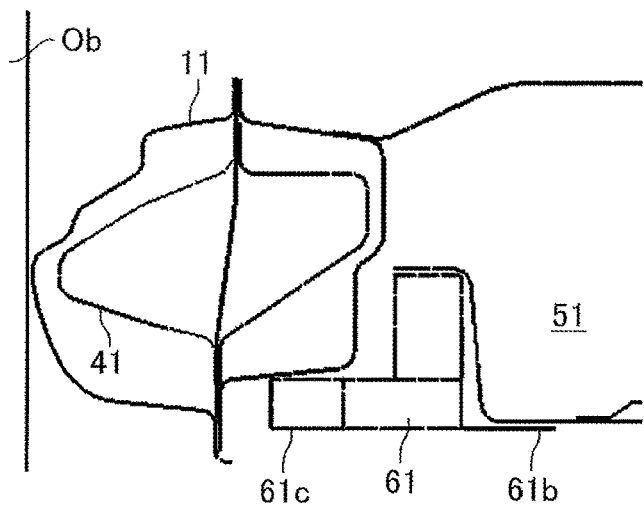
FIGS. 15A to 15C are conceptual diagrams showing a reference example contrasting with the battery pack structure according to the embodiment of the present invention.
Figure 15B:
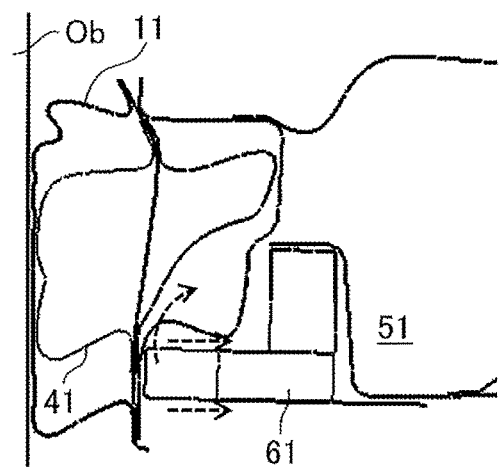
Figure 15C:
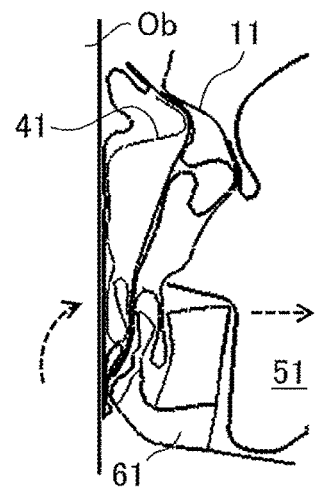

FIGS. 14A to 14C are conceptual diagrams showing how the battery side frame 61 is deformed when the load at the time of the side collision is applied to the battery pack structure C2 of the present embodiment. FIGS. 15A to 15C are conceptual diagrams showing a reference example contrasting with the battery pack structure C2 of the present embodiment.

As shown in FIGS. 14A to 14C, in the battery pack structure C2 of the present embodiment, as described above, the lower surface 61c of the battery side frame 61 is positioned lower than the support portion 61b of the battery side frame 61. As shown in FIG. 14B, when the load at the time of the side collision is input to the side sill 11 from the object Ob, the lower surface of the side sill 11 is deformed to exert a force to lift upward the outside in the vehicle width direction of the battery side frame 61. Meanwhile, since the lower surface 61c is positioned lower than the support portion 61b, a bending force of the battery side frame 61 is generated in an F direction in FIG. 14B. Thus, as shown in FIG. 14C, the force to lift upward the outside in the vehicle width direction of the battery side frame 61 is canceled, and thus it is possible to prevent the battery side frame 61 from being displaced upwardly. Therefore, according to the battery pack structure C2, it is possible to more reliably protect the battery pack 51 at the time of the side collision of the vehicle.

In contrast, in the reference example, as shown in FIG. 15A, there is no height difference between the support portion 61b and the lower surface 61c of the battery side frame 61. Therefore, as shown in FIG. 15B, when the force to lift upward the outside in the vehicle width direction of the battery side frame 61 is exerted, the bending force in the F direction is not generated unlike FIG. 14B. Therefore, in the reference example, as shown in FIG. 15C, the outside in the vehicle width direction of the battery side frame 61 is deformed to be lifted. That is, the battery pack structure C2 of the present embodiment shown in FIG. 14A is excellent in load transferring inward in the vehicle width direction as compared with the reference example shown in FIG. 15A.

In the battery pack structure C2 of the present embodiment, the rib R1 of the battery cross member 58 extends in the vehicle width direction. The support portion 16c formed on the side sill 11 for the battery side frame 61 is set at the position overlapping the extended line in the overlapping direction of the rib R1. According to such a battery pack structure C2, the load input via the side sill 11 at the time of the side collision can be efficiently transmitted from the battery side frame 61 to the battery cross member 58.

In the battery pack structure C2 of the present embodiment, the horizontally extending partition wall W of the partition walls W partitioning the hollow portion of the battery side frame 61 constitutes the extending portion Ex extending inward in the vehicle width direction from the support portion 16c. The extending portion Ex is formed at the position overlapping the extended line in the extending direction of the rib R1. According to such a battery pack structure C2, the load input via the side sill 11 at the time of the side collision can be efficiently transmitted from the battery side frame 61 to the rib R1.

In the battery pack structure C2 of the present embodiment, the support portion 61b of the battery side frame 61 for the battery pack 51 and the battery cross member 58 are connected to each other in the vertical direction by the bolts 40a. According to such a battery pack structure C2, since the battery side frame 61 and the battery pack 51 are brought into surface contact at the time of the side collision, it is excellent in efficiency of transmitting the load to the inside in the vehicle width direction.

In the battery pack structure C2 of the present embodiment, the battery side frame 61 has a higher strength on the inside in the vehicle width direction thereof than that on the outside in the vehicle width direction thereof. According to such a battery pack structure C2, it is possible to secure a stroke at the time of the side collision on the outside in the vehicle width direction of the battery side frame 61, and to reduce an intrusion amount of the side sill 11 inward in the vehicle width direction by high strength on the inside in the vehicle width direction of the battery side frame 61. Although the embodiments of the present invention have been described above, the present invention is not limited to the above-described embodiments and can be implemented in various forms.

REFERENCE SIGNS LIST

11: side sill
12: outer panel
13: inner panel
14: support panel
16c: support portion
20: dash board lower
21: floor panel
30: grommet
31: floor cross member
31a: first floor cross member
31b: second floor cross member
41: stiffener
42: outer stiffener
43: inner stiffener
44b1: bead
44a: first side surface
44b: first upper surface
44c: first lower surface
45b1: bead
45a: second side surface
45b: second upper surface
45c: second lower surface
51: battery pack
57: battery frame
58: battery cross member
58a: first battery cross member
58b: second battery cross member
61: battery side frame
61b: support portion
61c: lower surface
B: vehicle body
C: bottom structure
C1: side sill structure
C2: battery pack structure
Ex: extending portion
R1: rib
S: horizontal plane

The invention claimed is:
1. A vehicle body bottom structure comprising:
a battery pack disposed below a floor panel;
a side sill extending in a vehicle front-rear direction outside in a vehicle width direction; and
a battery side frame extending in the vehicle front-rear direction between the battery pack and the side sill and allowing the side sill to support the battery pack, wherein the battery side frame has an outside portion positioned outside in the vehicle width direction of the battery side frame at a side sill side of the battery side frame, and a support portion for supporting the battery pack from below formed inside in the vehicle width direction of the battery side frame, a lower surface of the outside portion of the battery side frame is positioned lower than a lower surface of the support portion of the battery side frame, and the lower surface of the outside portion is seamlessly continuous with the lower surface of the support portion.

2. The vehicle body bottom structure according to claim 1, wherein the battery side frame has a higher strength on the inside in the vehicle width direction thereof than that on the outside in the vehicle width direction thereof.

3. The vehicle body bottom structure according to claim 1, wherein a battery cross member extending in the vehicle width direction is disposed in the battery pack, the battery cross member has a rib extending in an extending direction of the battery cross member, and a support portion of the side sill for supporting the battery side frame is provided at a position overlapping an extended line in an extending direction of the rib.

4. The vehicle body bottom structure according to claim 3, wherein the battery side frame has an extending portion extending inwardly in the vehicle width direction from the support portion of the side sill, and the extending portion is formed at a position overlapping the extended line of the extending direction of the rib.

5. The vehicle body bottom structure according to claim 3, wherein the battery side frame and the battery cross member are vertically connected to each other.

* * * * *